July 21, 1942.                J. L. YOUNG ET AL                2,290,791
                    REINFORCED PROTECTION FOR CULVERTS
                        Filed May 14, 1940            2 Sheets-Sheet 1
FIG. 1.                    FIG. 2.
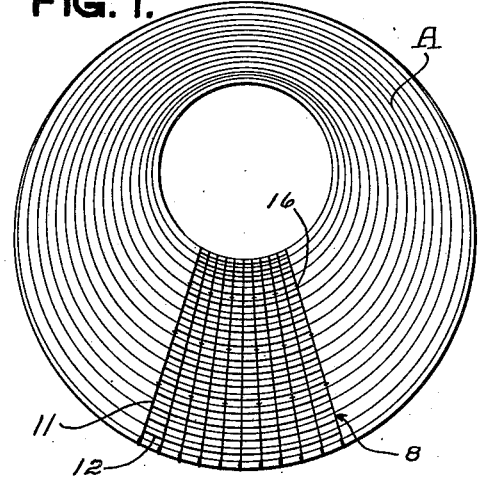
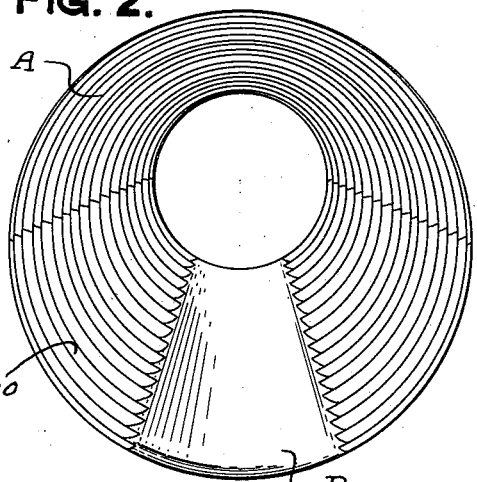
FIG. 3.
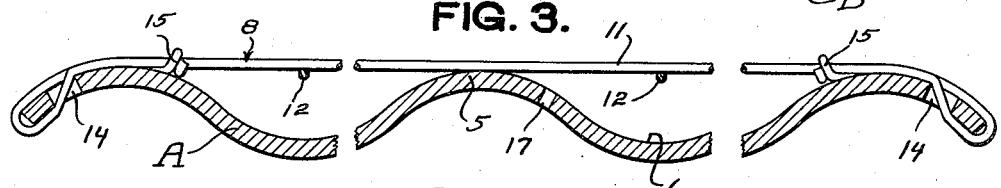
FIG. 4.
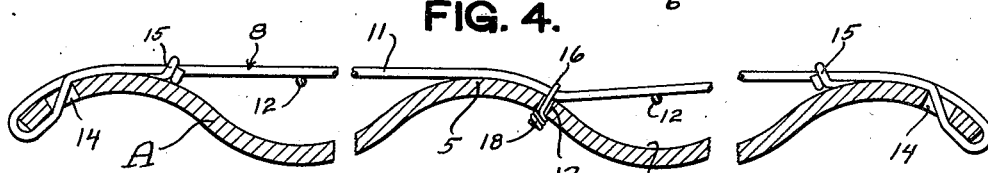
FIG. 5.
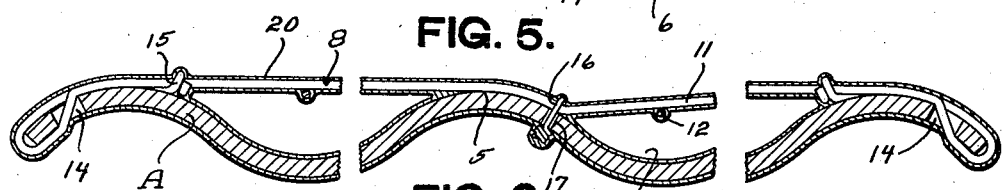
FIG. 6.
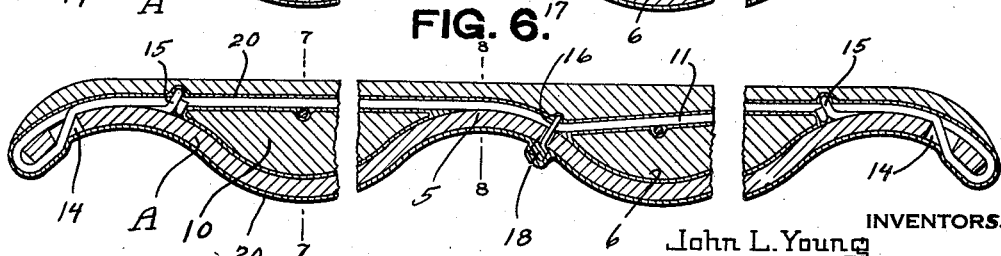
INVENTORS.
John L. Young
William P. Greenawalt
BY
ATTORNEYS.

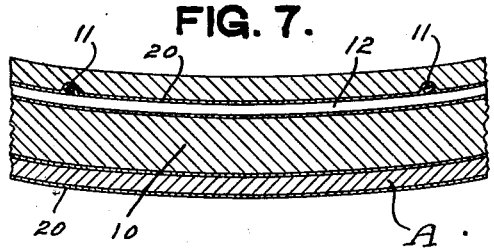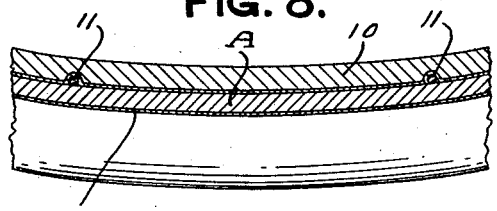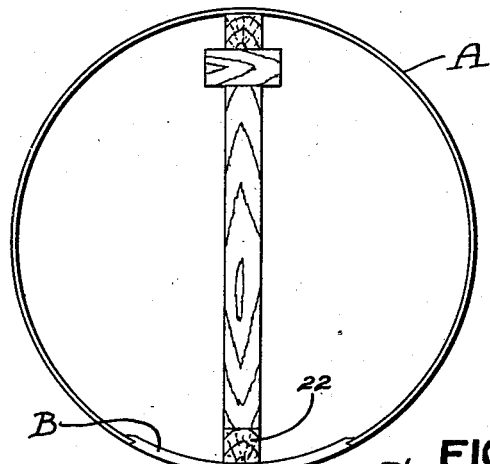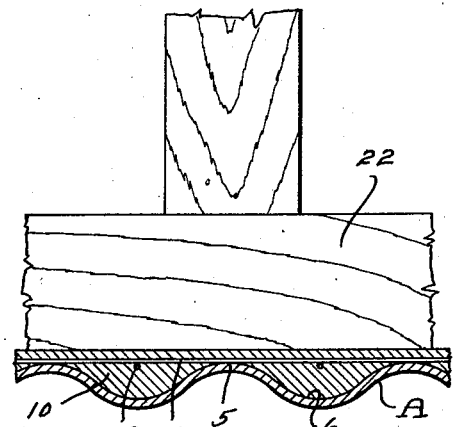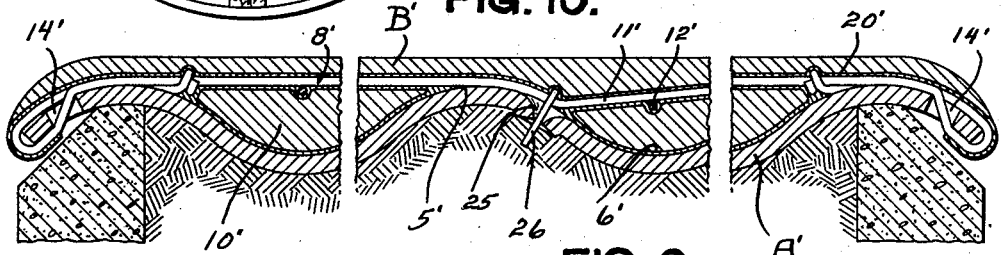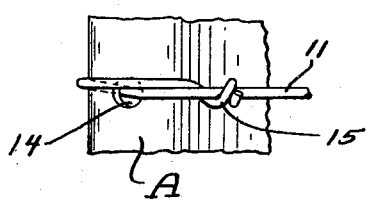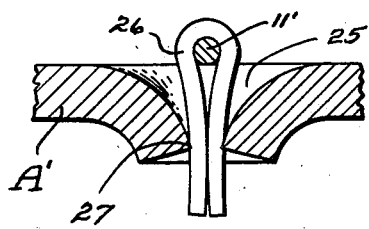

Patented July 21, 1942

2,290,791

UNITED STATES PATENT OFFICE 2,290,791

REINFORCED PROTECTION FOR CULVERTS

John L. Young and William P. Greenawalt, Chicago, Ill.

Application May 14, 1940, Serial No. 335,166

4 Claims. (Cl. 138—70)

The present invention relates to corrugated metal culvert pipes having a protective reinforcement for the invert thereof.

Experience has shown that corrugated metal culvert pipes generally deteriorate faster in the invert or lower section of the pipe than on any other portion of their periphery. While many different steps have been taken and numerous procedures attempted to reinforce this weak portion of the culvert, such attempts have been mostly based upon the use of a coating or paving which in itself is of such an adhering nature that no additional tie or reinforcement is considered necessary to hold the coating or paving in place. Results of such procedures have been inconsistent however, and indicate that some additional reinforcement would be valuable and highly desirable.

It is therefore a primary object of the present invention to provide a reinforced protection for the invert of corrugated metal culvert pipes.

A further object is to provide a reinforced protection for the invert of corrugated culvert pipe wherein the protective material is securely held in place in the pipe by means of a reinforcement attached to the pipe.

A further object is to provide a reinforced protection for inverts of corrugated culverts wherein the protective material is of a nature to be applied hot and troweled into place over the reinforcement so that the reinforcement is embedded in the protective material when set.

A further object resides in the specific nature and characteristics of the protective material permitting large diameter corrugated pipe to be strutted without displacing the material beneath the bottom of the strutting sill and the crest of the corrugations.

A still further object is to provide a reinforced protection of this character which may be applied to the inverts of culverts which are already in service and which show signs of needing their inverts protected.

Other objects and advantages of the invention will be apparent from the following detailed description, taken in connection with the accompanying drawings forming a part of this specification and in which drawings—

Figure 1 is a perspective view of a corrugated culvert pipe showing the first stage of applying the wire mesh reinforcement to the invert of the pipe.

Figure 2 is a perspective view of a corrugated culvert pipe having its invert provided with the reinforced protection in accordance with this invention.

Figure 3 is an enlarged detailed section taken longitudinally or along the flow line of the pipe and showing the first step of tying the longitudinal wires of the wire mesh reinforcement to the ends of the pipe.

Figure 4 is a sectional view along the flow line of the pipe and showing the second step of tying the intermediate portion of the wire mesh reinforcement to the pipe.

Figure 5 is a sectional view showing the next step of applying a primer coating to the pipe and reinforcement.

Figure 6 is a sectional view showing the final stage after the invert protection has been applied.

Figures 7 and 8 are enlarged fragmentary sections on the respective lines in Figure 6.

Figure 9 is a fragmentary detail view showing the manner of tying the longitudinal wires of the reinforcement to the ends of the culvert pipe.

Figure 10 is a sectional view along the flow line of a culvert pipe and showing the manner of reinforcing the inverts of culverts which are already in service.

Figure 11 is a fragmentary detail view showing the manner of securing the intermediate portion of the wire mesh reinforcement shown in Figure 10 to the culvert pipe.

Figure 12 is a view showing a strutted culvert pipe having its invert provided with the reinforced protection.

Figure 13 is an enlarged fragmentary section of the showing in Figure 12 along the flow line of the culvert.

Referring to the drawings in detail and wherein like reference characters designate corresponding parts thruout the several views, the letter A designates a corrugated metal culvert pipe of ordinary construction having its invert provided with the reinforced protection B.

The circumferentially corrugated pipe A may be manufactured and assembled in any preferred manner from galvanized corrugated sheets as is usual practice, whereby the corrugations form internal crests 5 spaced apart by internal valleys 6 extending circumferentially of the pipe.

The reinforced protection B is applied to the invert or lower portion of the culvert pipe A thruout the length of the pipe and comprises essentially a wire mesh reinforcement 8 and a protective reinforcement material 10.

The reinforcement 8 is formed of galvanized wire mesh of suitable gage forming longitudinal wires 11 adapted to extend along the flow line of the culvert pipe and transverse wires 12 which extend transversely across the invert of the pipe under the longitudinal wires 11. While the spacing of the transverse wires 12 may vary, it is preferred that the spacing be such as to dispose one of the transverse wires above each valley 6 with these wires spaced from the crests 5 of the pipe corrugations. If so desired, however, the wire mesh may have standard spacing and in which event the transverse wires will not correspond with standard spacing of the pipe corrugations. The width of the wire mesh reinforcement 8 may vary in accordance with the desired width of the invert to be protected. Provided in each end corrugation of the culvert pipe is a series of openings 14 into which the ends of the longitudinal wires 11 are tied as by looping the wires thru the openings and then twisting the wires upon themselves as at 15. After securing the wire mesh to the ends of the culvert pipe, certain of the longitudinal wires 11 are then tied to the culvert pipe at spaced apart locations intermediate their ends by means of tie wires 16 passed thru openings 17 which are offset from the crests 5 of the pipe corrugations, as clearly shown in Figure 3. These tie wires 16 need not be provided on every longitudinal wire, nor is it necessary that the wires be tied at each corrugation on the pipe in order to securely attach the wire mesh in firm contact with the crests of the pipe corrugations. In actual practice it has been found that by tying each second longitudinal wire 11 at about two foot spacings, the wire mesh reinforcement is securely attached to the culvert pipe.

The ties or attaching elements 16 may be of U-shaped lengths of wire which straddle the wires 11 and have their arms passed outwardly thru the openings 17 and twisted together as at 18 to form an enlargement at the exterior of the culvert pipe which prevents the tie wires from being drawn inward. This twisting of the tie wires, together with the offsetting of the openings 17 from the crests 5 of the pipe corrugations, acts to tension each second longitudinal wire 11 and draw portions of these wires 11 into the valleys 6 of the pipe, as clearly shown in Figure 4. This longitudinal tensioning of every second wire 11 by the ties 16 will also tension the transverse wires 12 and which will in turn cause portions of the intervening wires 11 to also be drawn into the valleys 6 and thus tension these intervening wires 11 whereby all longitudinal wires lay along the crest of the corrugations.

After the wire mesh reinforcement 8 has been attached to the invert of the culvert pipe, a primer coating 20, such as liquid asphalt, tar, or pitch, is applied to both sides of the pipe either by submerging the pipe in the coating or by painting the coating on with a brush or spray. While, if so desired, the primer coating 20 may be applied to the entire interior or exterior or both, in the example illustrated, the primer coating has been shown applied to the interior and exterior of the lower half of the pipe only. As shown in Figure 5, this primer coating 20 also provides a protective coating for the wire mesh reinforcement 8.

The protective material 10 is applied over the reinforcement 8 and completely fills the valleys 6 along the invert of the pipe, with the upper surface of the material conforming to the curvature of the pipe and completely embedding the reinforcement whereby a layer of the material overlies the crests 5 of the pipe corrugations, as shown in Figures 6 and 8. Thus, the protective material 10 is not only reinforced by, but is also held securely in place by the wire mesh reinforcement 8. If so desired, the upper surface of the protective material 10 may be finished off flat and not conform to the curvature of the pipe if a flat floor along the invert of the pipe is desired.

The protective material 10 consists of a mixture of sand, cement and asphalt in proper proportions to provide a protective reinforcing material possessing such characteristics as to be unyielding and resistant to displacement under load pressures. The mixture is heated and applied while hot by troweling the material into place over the wire mesh reinforcement 8, and after which the material is permitted to cool and is securely held in place by the reinforcement 8. While the proportions of the mixture may vary somewhat, it has been found that a mix of six parts sand, one part Portland cement, and one part asphalt by volume produces a protective reinforcing material possessing the desired characteristics. This produces a mixture of such consistency that it will not flow and must be troweled into place while hot. Either tar or pitch may be substituted in like proportion for the asphalt, if desired. While the reinforcing protective material 10 is slightly adherent to the culvert pipe, the material is held in place by the wire mesh reinforcement 8. Adhesive action of the bitumen component of the mixture is not relied upon nor is it sufficient to bond the material to the culvert pipe.

The characteristics of the unyielding reinforcing material 10 makes it particularly well adapted for use in the strutting of large diameter corrugated pipe, as shown in Figures 12 and 13, since it will allow the pipe to be strutted without the reinforcing material being displaced by the strutting sill 22. In present practice, where resilient or soft non-brittle material is used as a protection for the culvert invert, the sill used in the strutting procedure is generaly mashed or pressed into the protection material until all of the material overlying the crests of the corrugations has been displaced or crowded out from beneath the sill. This not only exposes the crests of the corrugations to the abrasive action of materials such as sand and stones passing thru the culvert, but also defeats the purpose of the strutting in permitting deflection of the culvert thru the sinking of the sill into the yielding protection material.

With particular reference to Figures 10 and 11, the reinforced protection is also susceptible of being applied to culverts which are already in service and which show signs of needing their inverts protected. In Figures 10 and 11, the corrugated culvert pipe has been designated A' and the reinforced protection B'. The protection B' comprises essentially a wire mesh reinforcement 8' including longitudinal wires 11' and transverse wires 12', and a protective reinforcement material 10'. The end corrugations of the pipe A' are provided with openings 14' into which the ends of the longitudinal wires 11' are tied for securing the reinforcement 8' along the invert of the culvert. Holes 25 are then punched in the pipe at suitable points and U-shaped wire ties 26 are looped over the longitudinal wires and driven into place in the holes 25 to hold the wire mesh down intermediate its ends. These holes 25 are offset from the crest 5' of the corrugations whereby portions of the longitudinal wires are drawn into the valleys 6' of the corrugations to further tighten the wire mesh in place. As shown exaggerated in Figure 11, the punched holes 25 form sharp biting edges 27 which bite into the wire tie members 27 and prevent withdrawal of the tie members.

After the wire mesh reinforcement 8' has been secured in place, a primer coating 20', such as liquid asphalt or the like, is applied over the culvert invert and the wire wesh. The protective material 10' is then applied over the reinforcement 8' so as to completely fill the valleys 6', and form a layer over the crests 5'. This protective material 10' is of the same nature as the protective material 10, consisting of a mixture of sand, cement and asphalt, tar or pitch, and is applied while hot by troweling the material into place.

Thus it will be seen that the reinforced protection may be readily applied to the invert of corrugated culvert pipes which are already in service, as well as to those to be placed in service. In both procedures, the protective material is amply reinforced by a wire mesh reinforcement which is securely tied to the invert of the culvert and acts to hold the protection in place. It will also be seen that a novel method of securing the wire mesh reinforcement in place has been disclosed wherein the wire mesh is drawn tightly into place upon the crests of the pipe corrugations.

Changes in detail may be made to the form of invention herein shown and described, without departing from the spirit of the invention or the scope of the following claims.

We claim:

1. A culvert comprising a corrugated metal pipe, and a reinforced protection for the invert of the pipe, comprising a wire mesh reinforcement including longitudinal and transverse wires, means securing the ends of the longitudinal wires to the ends of the pipe, tie members securing the intermediate portions of the longitudinal wires to the pipe and offset from the crests of the pipe corrugations to tension the wire mesh, and a protective material applied over the wire mesh and being substantially unyielding to displacement under load pressures when set.

2. A culvert comprising a corrugated metal pipe, and a reinforced protection for the invert of the pipe, comprising a wire mesh reinforcement including longitudinal and transverse wires, means securing the ends of the longitudinal wires to the ends of the pipe, tie members securing the longitudnial wires at spaced points intermediate their ends to the pipe and forming tensioning kinks in the longitudinal wires, a primer coating over the wire mesh and at least the invert of the pipe, and a protective material applied over the wire mesh and filling the corrugations beneath the wire mesh.

3. A culvert comprising a corrugated metal pipe, and a reinforced protection for the invert of the pipe, comprising a wire mesh reinforcement including longitudinal and transverse wires, openings at each end of the invert of the pipe into which the ends of the longitudinal wires are secured, U-shaped tie wires securing the intermediate portions of the longitudinal wires to the pipe at points offset from the crests of the pipe corrugations, a primer coating covering the wire mesh and at least the invert of the pipe, and a protective material embedding the wire mesh and filling the pipe corrugations under the wire mesh.

4. A reinforced protection for the invert of corrugated metal culvert pipe, comprising a wire mesh reinforcement including longitudinal and transverse wires, openings at each end of the invert for securing the ends of the longitudinal wires to the ends of the pipe, punched openings along the pipe in alignment with the end openings and offset from the crests of the pipe corrugations, U-shaped attaching members straddling the longitudinal wires and driven into the punched openings for securing and tensioning the longitudinal wires, a primer coating over the wire mesh and invert of the pipe, and a protective material covering the wire mesh.

JOHN L. YOUNG.
WILLIAM P. GREENAWALT.